March 24, 1953   P. A. MONTANUS ET AL   2,632,353
STEP TURNER
Filed Feb. 26, 1948   7 Sheets-Sheet 1
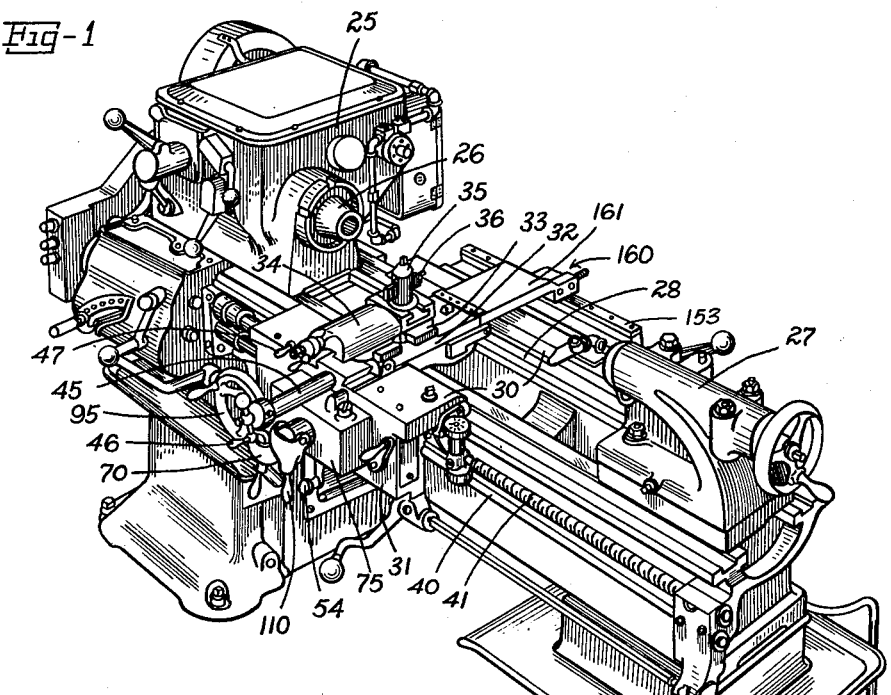
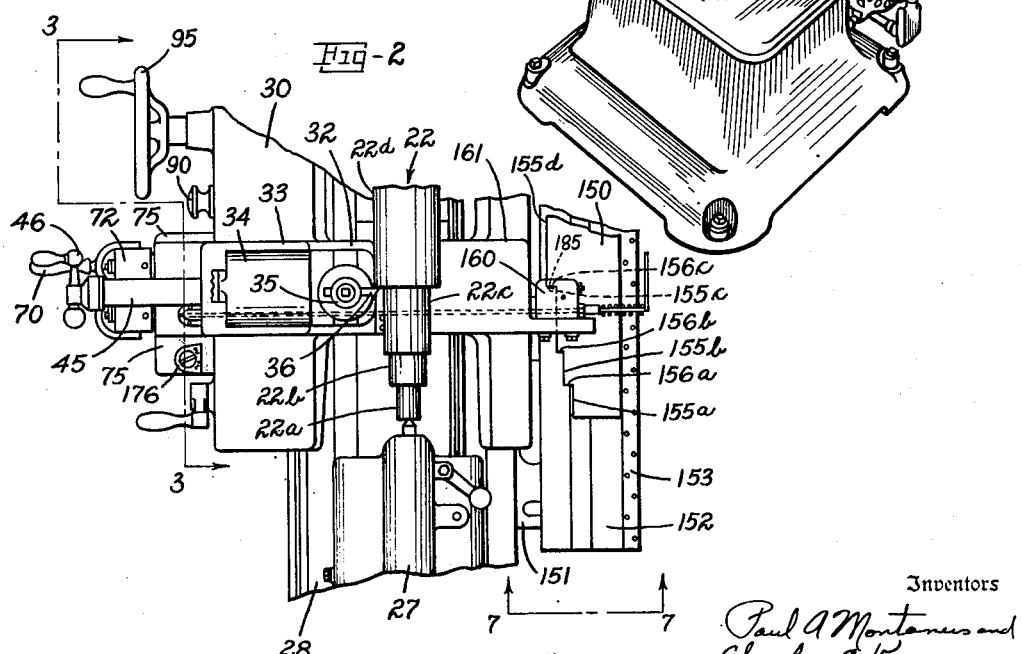
Inventors
Paul A. Montanus and
Charles E. Kraus
Marechal & Biebel
Attorneys

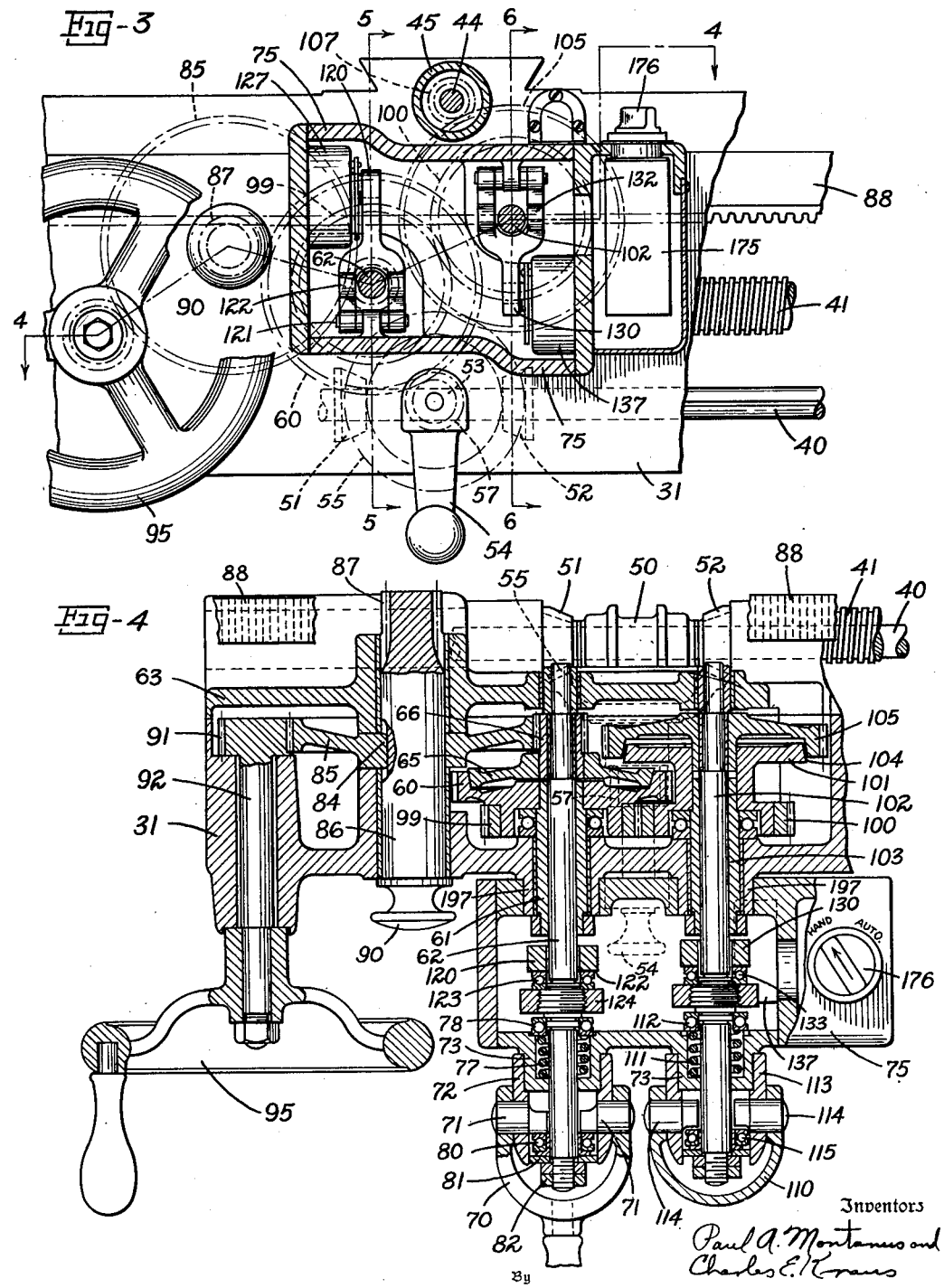

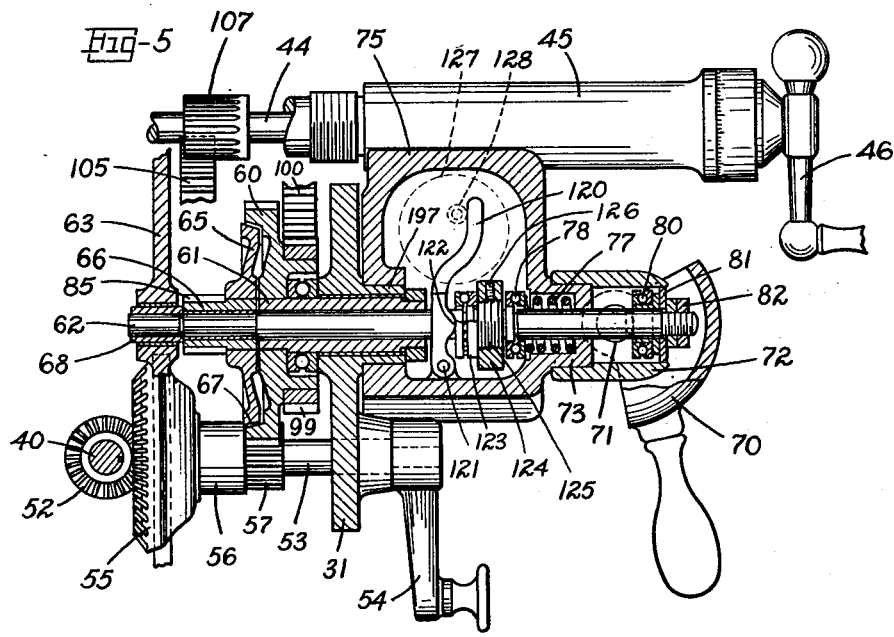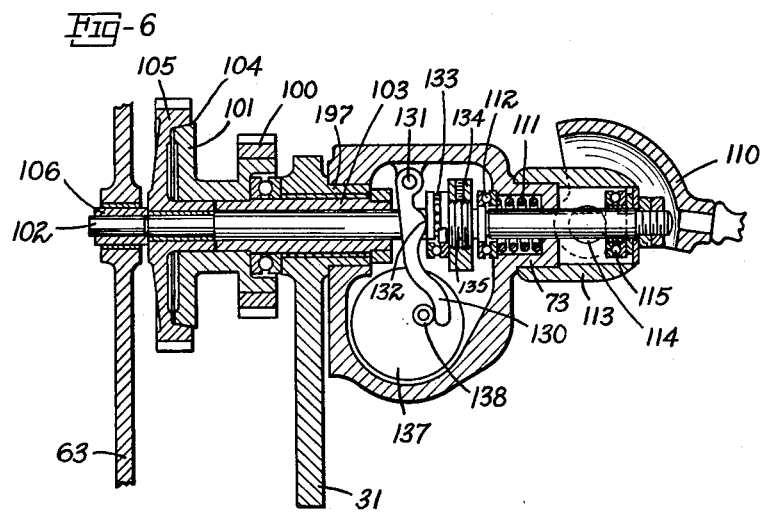

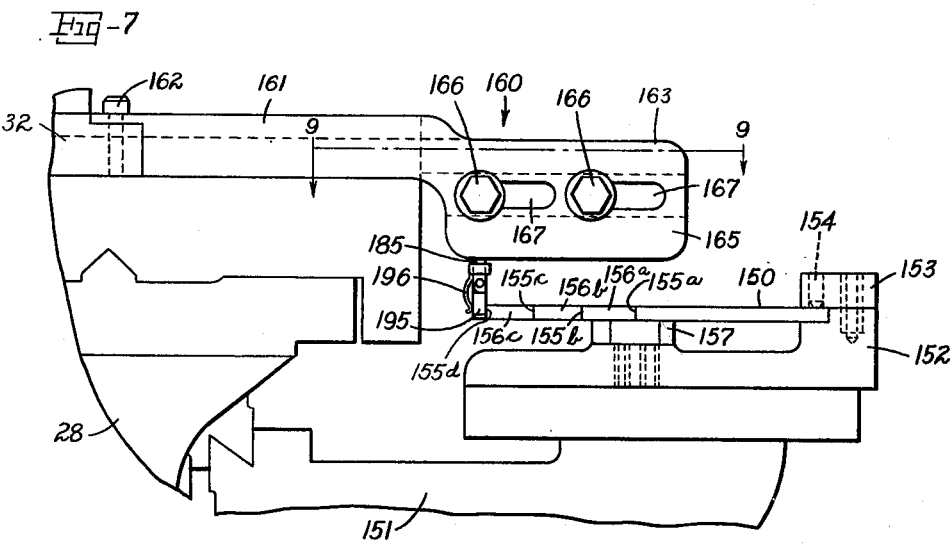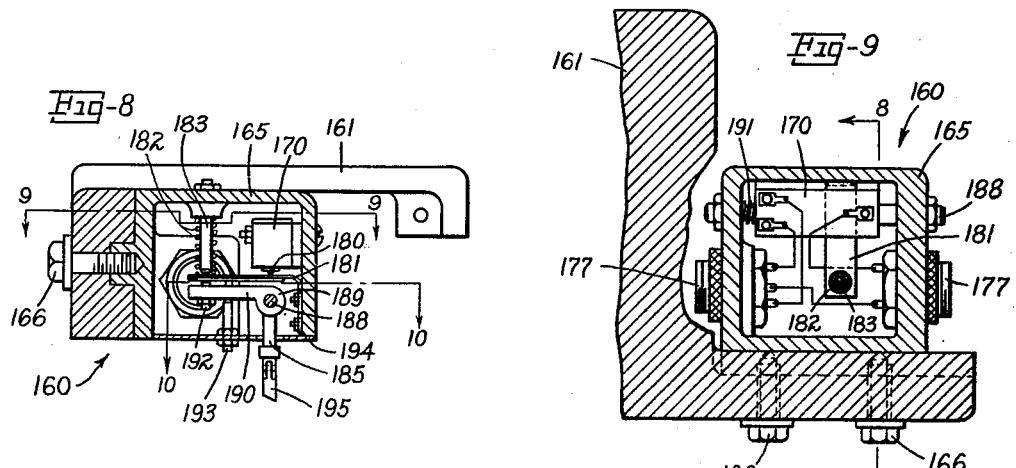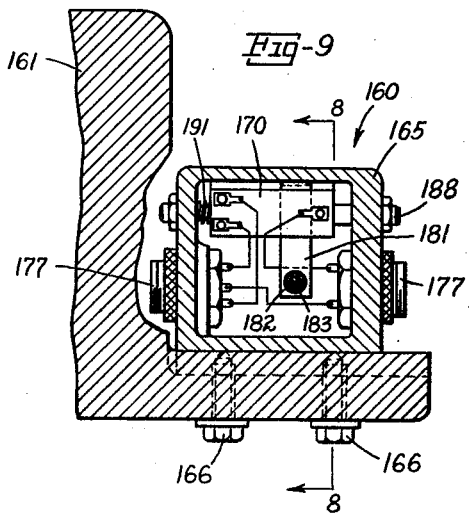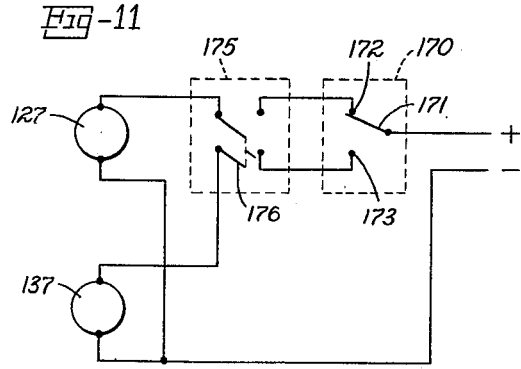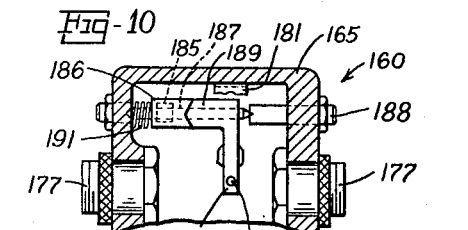

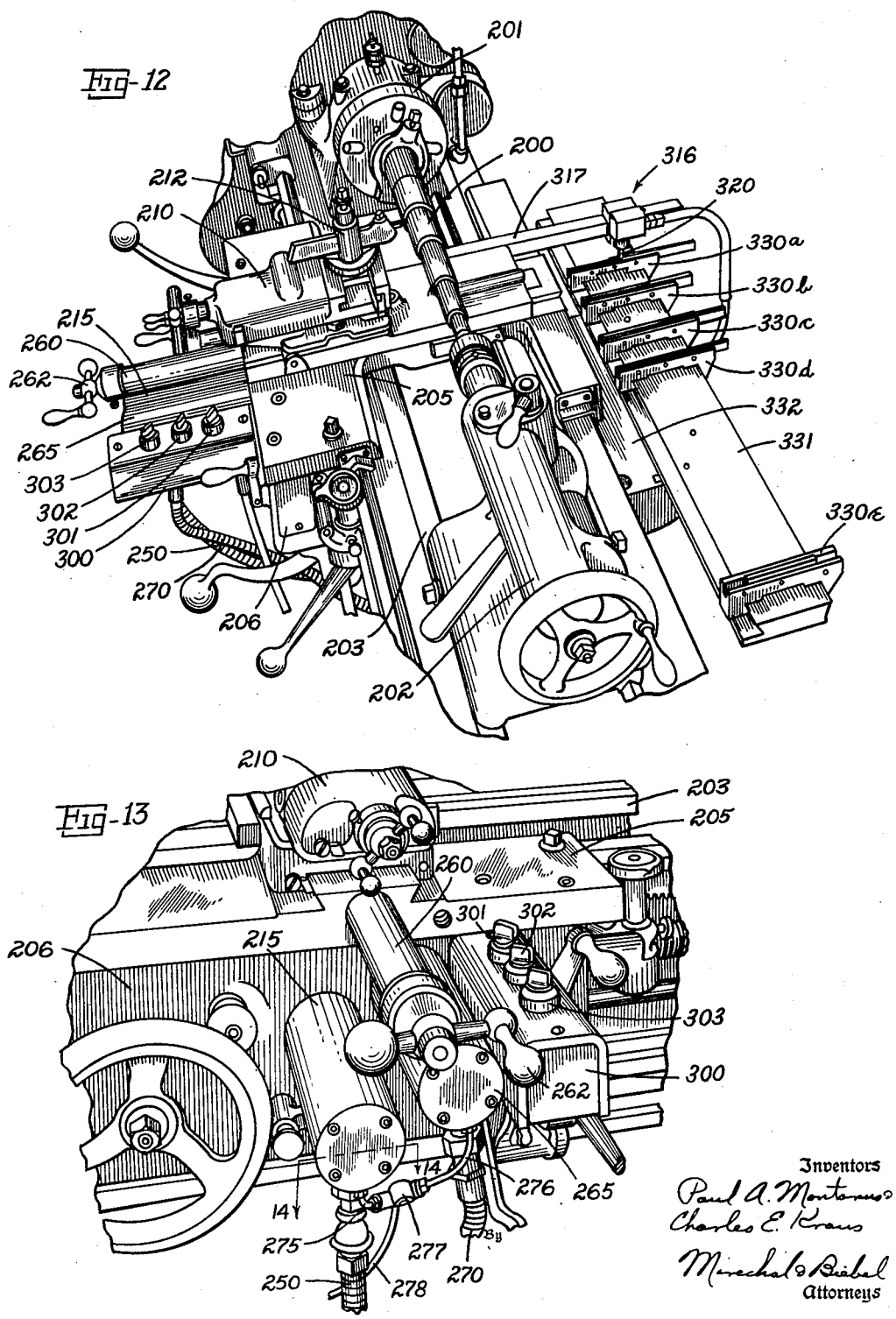

March 24, 1953  P. A. MONTANUS ET AL  2,632,353
STEP TURNER
Filed Feb. 26, 1948  7 Sheets-Sheet 6
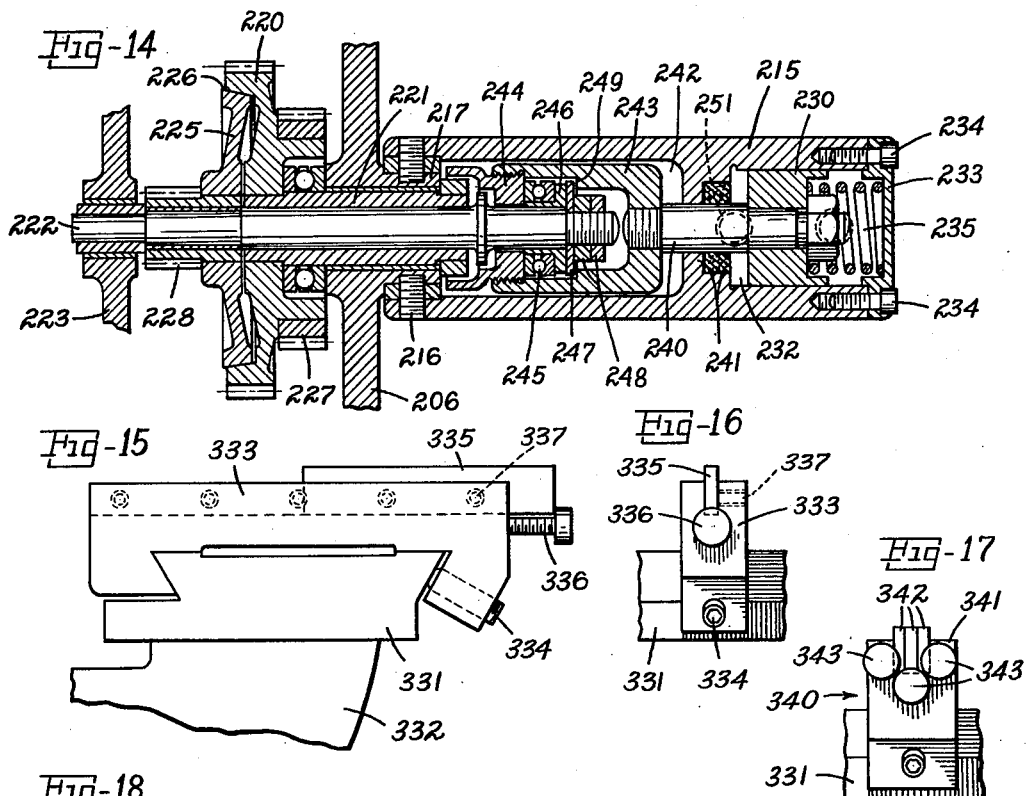
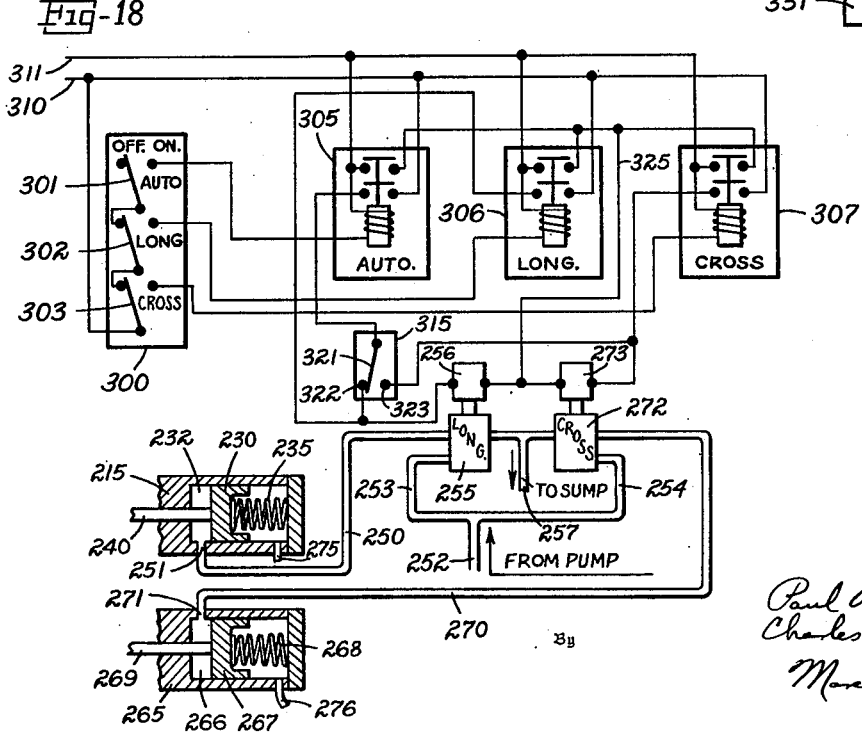
Inventors
Paul A. Montanus
Charles C. Kraus
Morchal Diebel
Attorneys Patented Mar. 24, 1953

2,632,353

UNITED STATES PATENT OFFICE 2,632,353

STEP TURNER

Paul A. Montanus and Charles E. Kraus, Springfield, Ohio, assignors to The Springfield Machine Tool Co., Springfield, Ohio, a corporation of Ohio Application February 26, 1948, Serial No. 11,064

10 Claims. (Cl. 82—14)

This invention relates to lathes.

One of the principal objects of the invention is to provide a simple and effective attachment for a lathe which will make possible automatic step turning operations on the lathe through the conventional mechanical drives employed for ordinary longitudinal and cross feeding purposes.

Another object is to provide such an attachment which can be readily built into a new lathe and which is also of such simple and compact construction that it can be installed quickly and easily on a pre-existing lathe to adapt the lathe for automatic step turning operations without disabling the other lathe functions, controls or operations.

Still another object is to provide such an attachment for mounting on a lathe carriage which makes use of the clutches customarily employed for transmitting the drive to the carriage and compound rest in ordinary lathe operation and which is effective to cause automatic alternate engagement and disengagement of the clutches to produce a step turned workpiece in accordance with a predetermined pattern.

It is also an object of the invention to provide simple and effective alternative attachments for guiding step turning operations of a lathe by means of a preformed template or master, by a specimen or replica of the workpiece to be produced, or by a series of adjustable stops which can be quickly and easily arranged in proper longitudinal and lateral spacing to define a desired step turning pattern to be reproduced on the lathe.

Other objects and advantages of the invention will be apparent from the following description, the accompanying drawings and the appended claims.

In the drawings, in which like characters of reference designate like parts throughout—

Fig. 1 is a view in perspective showing a lathe embodying step turning apparatus in accordance with the invention;

Fig. 2 is a fragmentary top plan of the lathe showing the carriage and parts supported thereby;

Fig. 3 is a sectional view on a larger scale taken on the line 3—3 of Fig. 2;

Fig. 4 is a sectional view on the line 4—4 of Fig. 3;

Fig. 5 is a view in vertical section on the line 5—5 of Fig. 3;

Fig. 6 is a view in vertical section on the line 6—6 of Fig. 3;

Fig. 7 is a fragmentary elevational view on a larger scale looking in the direction indicated by the line 7—7 of Fig. 2;

Fig. 8 is a section on the line 8—8 of Fig. 7 and also of Fig. 9;

Fig. 9 is a section on the line 9—9 of Fig. 7 and also of Fig. 8;

Fig. 10 is a fragmentary section on the line 10—10 of Fig. 8;

Fig. 11 is a wiring diagram;

Fig. 12 is a fragmentary view in perspective showing a lathe embodying a modified form of step turning apparatus in accordance with the invention;

Fig. 13 is a perspective view on a larger scale showing the apron of the lathe of Fig. 12;

Fig. 14 is a sectional view on a larger scale similar to Figs. 5 and 6 and taken approximately on the line 14—14 of Fig. 13;

Fig. 15 is an elevational view of one of the stop members defining the step turning pattern in the lathe of Fig. 12;

Fig. 16 is an end view of the stop member of Fig. 15;

Fig. 17 is an end view of a modified construction of stop member;

Fig. 18 is a circuit diagram;

Figure 19:
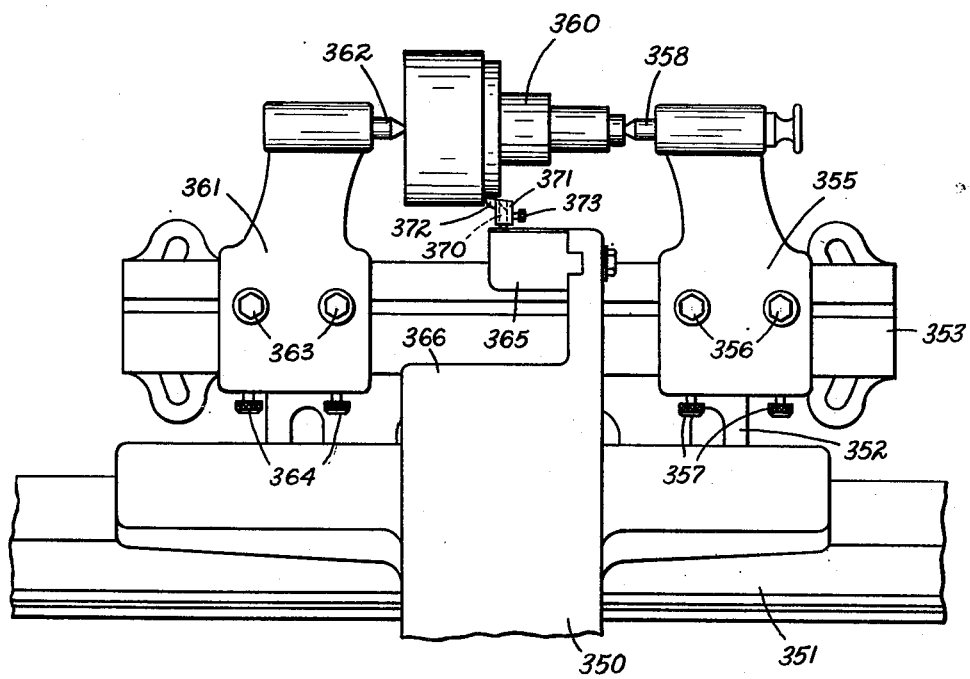
Fig. 19 is a fragmentary top plan view of a lathe embodying a form of the invention and adapted to carry out a step turning operation when guided by a duplicate of the workpiece to be produced.

Referring to the drawings, which illustrate preferred embodiments of the invention, Figs. 1 and 2 show a lathe incorporating step turning apparatus in accordance with the invention for producing a step turned workpiece 22. The lathe includes a headstock 25 containing the main driving mechanism for the spindle 26 which supports one end of the workpiece, the other end being supported by a tailstock 27 mounted for longitudinal adjustment on the lathe bed 28 with respect to headstock 25. The lathe carriage 30 provided with an apron 31 is mounted for movement longitudinally on the lathe bed and supports a compound rest comprising a bottom or cross slide 32, swivel 33 and top slide 34 on which is mounted the tool post 35 for carrying a tool 36. The feed rod 40 for driving the carriage extends across the front of the bed below the usual lead screw 41 which is used for thread chasing but not in connection with the step turning operations of the lathe. Cross feeding movement of the compound rest is effected by the cross feed screw 44 (Figs. 3 and 5) journaled in the cross feed screw bushing 45 and provided with a ball crank 46 for manual operation. The top slide may be similarly adjusted manually on swivel 33 by means of the ball crank 47.

The carriage 30 and apron 31 support two selectively operable clutches for establishing driving connections from the feed rod 40 to effect alternate longitudinal and cross feeding movement of the compound rest. Referring more particularly to Figs. 3 to 6, the feed rod 40 is driven from the main drive in the headstock 25 through the usual gear transmission and has a reversible dog clutch member 50 (Fig. 4) splined thereon and adapted for selective connection with either of two bevel pinions 51 and 52. The clutch 50 is controlled by shaft 53 (Fig. 5), having a crank handle 54 at its outer end for manual operation. In carrying out step turning operations in accordance with the present invention, only one of these pinions is required for work movement, for example the pinion 51, the other pinion 52 being used only for reversing the drive to return the carriage to its starting position under normal operation.

The pinion 51 engages a bevel gear 55 on shaft 53, and the hub 56 of gear 55 includes a pinion 57 meshing with a gear 60 rotatably mounted by an elongated bushing 61 on a shaft 62 which is in turn mounted for limited axial movement in the apron 31 and the back plate 63 of the apron. Gear 60 cooperates with a clutch member 65 to form a friction clutch, the member 65 being mounted on the hub of a pinion 66 and having a beveled friction face 67 adapted for clutching engagement with a complementary frusto-conical recess in the adjacent face of gear 60 as shown in Figs. 4 and 5. Clutch member 65 and pinion 66 are secured to shaft 62 by a bushing or collar 68 for axial movement with the shaft with respect to gear 60 to provide for clutching engagement and disengagement.

Manual control over this movement of shaft 62 to operate clutch 60—65 is afforded by a handle 70 mounted by means of a pair of cam pins 71 in a sleeve 72 secured to one of a pair of bosses 73 on the front of a casing 75 which is in turn mounted on the front of apron 31. A spring 77 is mounted within casing 75 and engages a thrust bearing 78 on shaft 62 to bias the shaft to a position of relative disengagement of the clutch 60—65. A similar thrust bearing 80 is held axially on the outer end of shaft 62 by collar 81 and nuts 82, and cam pins 71 cooperate with bearing 80 when the handle 70 is raised as shown in Fig. 4 to force the shaft 62 axially outwardly, from left to right as viewed in Fig. 5, and thus to pull clutch member 65 into clutching engagement with gear 60. This movement may be relatively slight, a total movement of only about $\frac{3}{32}$ inch having been found satisfactory, and it will be noted that clutch 60—65 is shown in engaged position in Fig. 4 and in disengaged position in Fig. 5.

The pinion 66 meshes with the rack gear 85 (Fig. 4), which is splined or keyed at 84 on the shaft portion 86 of the rack pinion 87 meshing with rack 88, which is mounted on the bed above the lead screw 41. Rack pinion shaft 86 is axially slidable in the apron and plate 63 to move the rack pinion 87 into and out of mesh with rack 88 and is provided with a suitable hand operating knob 90. It will thus be seen that when clutch 60—65 is in engagement, the drive is transmitted from feed rod 40 and clutch 50 through bevel pinion 51, bevel gear 55, pinion 57, gear 60, clutch member 65, pinion 66 and gear 85 to the rack pinion 87 and rack 88, and the rotation of rack pinion 87 with respect to the rack 88 will accordingly cause the carriage to move longitudinally of the bed.

The reverse drive to move the carriage in the opposite direction is obtained by shifting clutch 50 to engage with the bevel pinion 52. Rack gear 85 also meshes with a pinion 91 on a shaft 92 provided with a hand wheel 95 for manually driving the carriage.

The drive for effecting cross feeding movement of the compound rest includes a selectively operable clutch similar to the clutch 60—65. The gear 60 includes a hub on which is secured a pinion 99 meshing with a similar pinion 100 secured on the hub of a clutch member 101 rotatably mounted on a shaft 102 by means of a bushing 103. The shaft 102 is similar to shaft 62 and is similarly mounted for axial movement in apron 31 and plate 63. The clutch member 101 has a beveled clutch face 104 adapted for clutching engagement with a complementary frusto-conical recess in a gear 105. The gear 105 is rotatable on shaft 102 but is secured for axial movement therewith by means of a collar 106 axially slidable in plate 63. The gear 105 meshes with the cross feed pinion 107 on cross feed screw 44 as shown in Figs. 3 and 5.

The shaft 102 is provided with means for manually engaging the clutch 101—105 similar to the corresponding manual controls for the clutch 60—65. The handle 110 is operable similarly to the handle 70 to pull the shaft 102 outwardly of the carriage across the biasing force of a spring 111 positioned within casing 75 and operating against thrust bearing 112. The handle 110 is mounted on sleeve 113 by cam pins 114 similar to the cam pins 71 and cooperating with thrust bearing 115 at the outer end of shaft 102. Thus when handle 110 is hanging down in a position similar to that shown for handle 70 in Fig. 5, the clutch 101—105 is disengaged as shown in Fig. 4, and when the handle is raised to the position shown in Fig. 6, the shaft is pulled outwardly and thus carries gear 105 into a position of clutch engagement with the beveled friction face 104 of clutch member 101 as shown in Fig. 6. With the parts in the position shown in Fig. 6, the drive will be transmitted from feed rod 40 through clutch 50, bevel pinion 51, bevel gear 55, pinion 57, gear 60, pinions 99 and 100, clutch member 101 and gear 105 to the cross feed pinion 107 (Figs. 3 and 5) to cause rotation of cross feed screw 44 and thus to effect cross feeding movement of the compound rest with respect to the carriage 30 and bed 28.

Power operated means are provided for co-operation with springs 77 and 111 to effect selective engagement and disengagement of the clutches 60—65 and 101—105 to cause the lathe to carry out a step turning operation in accordance with a preformed template or other guiding means. Referring to Figs. 3 and 5, a forked lever 120 straddles the shaft 62 and is pivotally mounted at 121 in the casing 75. This lever includes cam portions 122 adapted to engage a thrust bearing 123 on the shaft 62 which is slidable on shaft 62 and abuts a collar 124 threaded on an enlarged portion 125 of shaft 62, the collar 124 having a set screw 126 for holding it in axially fixed position on shaft portion 125.

A rotary solenoid 127 is mounted in the side of casing 75 and carries a roller 128 positioned to engage the upper end of lever 120. The control circuits to solenoid 127 are such that when the solenoid is deenergized, the spring 77 will force shaft 62 from right to left in Fig. 5 and hence to a position of disengagement of clutch 60—65. When the solenoid 127 is energized, it will rotate in clockwise direction as viewed in Fig. 5, thus acting through roller 128 to force lever 120, to swing in clockwise direction about its pivot point 121 and thus to act through cam portion 122, thrust bearing 123 and collar 124 to move shaft 62 against the biasing force of spring 77 and thus to cause engagement of clutch 60—65. The threaded mounting of collar 124 on shaft portion 125 provides for adjustment to assure a full stroke of solenoid 127 when the latter is energized.

The operating means for clutch 101—105 includes a forked lever 130 mounted to straddle shaft 102 and pivotally mounted at 131 in the upper part of casing 75. The lever 130 includes cam portions 132 cooperating with a thrust bearing 133 on shaft 102, the collar 134 and shaft portion 135 being similar to the corresponding parts on shaft 62. A rotary solenoid 137 is mounted in casing 75 and carries a roller 138 engaging the lower end of lever 130. The operation of this solenoid is similar to that of solenoid 127 as already described. When solenoid 137 is deenergized, spring 111 biases shaft 102 from right to left in Fig. 6, and hence to a position of disengagement of clutch 101—105. When the solenoid is energized it rotates in clockwise direction as viewed in Fig. 6, and thus forces lever 130 to move in counterclockwise direction and to force shaft 102 to a position of engagement of clutch 101—105.

Means are provided for selectively energizing the solenoids 127 and 137 to effect selective engagement and disengagement of the clutches 60—65 and 101—105 and thus to cause alternate longitudinal and cross feeding movement of the cross slide 32 to carry out a step turning operation on the workpiece 22 in accordance with a predetermined pattern. Referring more particularly to Figs. 2 and 7, a template comprising a flat plate 150 is mounted in fixed relation with the lathe bed 28 by means of a bracket 151 secured to the rear of the bed. A plate 152 is bolted on top of bracket 151, and a hold down plate 153 is bolted along the outer edge of plate 152 and in overhanging relation therewith to form a groove for receiving the outer edge of plate 150, which is locked therein by means of set screws 154 as shown in Fig. 7. Template 150 is provided with an inner guiding edge comprising a series of relatively offset longitudinal portions 155a to 155d which correspond to the portions 22a to 22d respectively of the workpiece, and these longitudinal portions of the template edge are connected by laterally arranged shoulder portions 156a to 156c. Spacers 157 (Fig. 7) may be bolted to the upper surface of plate 152 to provide additional support for the template 150.

A feeler or sensing unit indicated generally at 160 is secured to a bracket 161 which is in turn bolted at 162 to the cross slide 32. Bracket 161 includes an arm portion 163 to which the casing 165 of the unit 160 is secured by bolts 166 in slots 167 to provide for adjustment laterally of the lathe. A single pole, double throw switch 170 (Fig. 8) is mounted in casing 165, and the switch arm 171 of switch 170 is connected to one side of the main power line as shown in Fig. 11. The two switch terminals 172 and 173 are connected respectively to solenoids 127 and 137 through a double pole, single throw switch 175, shown in Figs. 3 and 4 as mounted in casing 75 and provided with a manual control member 176. Sockets 177 are mounted in the walls of casing 165 and provide for quick connection between switch 170 and the power line and operating circuits of the lathe.

The switch 170 is provided with an external operating button 180, and an L-shaped spring lever 181 is bolted within casing 165 in position to extend below button 180. A coil spring 182 is supported within the casing by a stud 183 and normally exerts pressure downwardly against the free end of lever 181 to force the lever away from button 180 and to effect release of this button so that the switch arm 171 will be in its normal position of contact with the switch terminal 172 to complete the energizing circuit through solenoid 127 and thus to cause engagement of clutch 60—65. The circuit arrangement is such, as shown in Fig. 11, that when lever 181 is forced into contact with button 180, switch arm 171 shifts into contact with terminal 173, thus deenergizing solenoid 127 and completing the energizing circuit through solenoid 137 to effect disengagement of clutch 60—65 and engagement of clutch 101—105.

A control finger 185 extends downwardly from a sleeve 186 pivotally mounted in casing 165 by a shaft 187 having sharp ends supported in suitable end bearings mounted respectively in the wall of the casing and in a stud 188 threaded in the casing for purposes of adjustment, sleeve 186 having a sliding fit on shaft 187. One end of sleeve 186 is formed with a V-groove (Fig. 10) to receive the complementary shaped end of a similar sleeve 189 from which a lever arm 190 extends at right angles to finger 185, the adjacent ends of the two sleeves 186 and 189 thus forming a dog clutch. The sleeve 189 is force fitted or otherwise secured to shaft 187, and a spring 191 normally urges the two sleeves into clutching engagement so that they cooperate with finger 185 and arm 190 to form a bell crank unit as shown in Fig. 8.

The lever arm 190 carries a pin 192 adapted to engage the underside of spring lever 181 so that when the bell crank is rotated in clockwise direction as viewed in Fig. 8, the parts 190 and 192 will force lever 181 upwardly against the urging of spring 182, thus forcing lever 181 against button 180 to effect shifting of switch arm 171 as described. A pin or stud 193 is mounted in the cover plate 194 which closes the bottom of casing 165 and acts as a stop to abut lever 190 for limiting counterclockwise movement of the bell crank, the stud 183 similarly serving as a stop to limit clockwise movement of the bell crank.

The control finger 185 extends downwardly through a suitable hole in the cover plate 194, and it includes an end portion 195 pivoted thereto and normally held in axial alignment therewith by a spring 196 (Fig. 7). With this arrangement, if the feeler unit should accidentally be driven against the template during cross feeding movement toward the back of the lathe, as might occur during initial setting up operations, the finger portion 195 will pivot against spring 196 to ride over the template and thus avoid injury to the remainder of the unit. The dog clutch connection between the sleeves 186 and 189 of the bell crank similarly prevent injury to the feeler unit in the event that the control finger should strike the template or any other abutment in such manner as to tend to cause greater pivotal movement of the bell crank than is permitted by the stop pins 183 and 193. It will be seen that if such movement should occur, the sleeve 186 will move axially against spring 191 and at the same time move angularly with respect to sleeve 189 and out of clutching engagement therewith, thus preventing undue stress on lever arm 190.

It will accordingly be seen that spring 182 normally acts through lever 181 to bias the bell crank unit in counterclockwise direction as viewed in Fig. 8 to the limit permitted by stud 193. The control finger 185 thus extends downwardly and slightly beyond the vertical, i. e., to the right as viewed in Fig. 8, and lever 181 is out of contact with switch button 180, this being the position in which solenoid 127 is energized to effect engagement of clutch 60—65. When the control finger 185 is moved to rock the bell crank against the action of spring 182, the lever arm 190 and pin 192 raise the lever 181 against the urging of spring 182 and into contact with button 180. This in turn effects shifting of switch arm 171 out of contact with terminal 172 and into contact with terminal 173, thus deenergizing solenoid 127 and energizing solenoid 137, this action in turn effecting disengagement of clutch 60—65 and substantially simultaneous engagement of clutch 101—105.

In operation with the lathe constructed as described in connection with Figs. 1 to 11, the guiding edge of the template plate 150 defines the step turning pattern to be reproduced on the workpiece 22. The workpiece may first be forged or otherwise roughly formed to approximate its final design within the cutting range of a single cut of tool 36, for example by operating the lathe utilizing the manual controls, to minimize the time required for the finishing operation. For the automatic step turning operation, the workpiece is mounted with its small end supported by the tail stock 27, and the carriage and compound rest are adjusted by operation of the hand controls to proper position for the first cut to form the portion 22a of smallest diameter. The adjustment of the compound rest also includes the setting of the feeler unit 160 so that control finger 185 is in contact with the edge portion 155a of template 150. This positioning and adjustment may be done manually, by operation of ball cranks 46 and 47 and handwheel 95, or the mechanical drive may be employed by suitable manipulation of clutch handles 70 and 110, and during this operation the switch control member 176 is in the open or "Hand" position indicated in Fig. 4.

After the lathe is properly set, the control member 176 is shifted to its closed or "Auto" position, and clutch member 50 on the feed rod is shifted to a position of engagement with pinion 51. With the control finger 185 in contact with the edge portion 155a of the template, solenoid 127 will be energized to effect engagement of clutch 60—65, and the carriage will accordingly be driven longitudinally of the bed toward the headstock until control finger 185 reaches the shoulder 156a on the template. When this occurs, the relative movement of control finger 185 and shoulder 156a causes the bell crank unit to rock in clockwise direction as viewed in Fig. 8 and thus to act through lever arm 190 to effect shifting of switch arm 171 to a position opening the energizing circuit through solenoid 127 and closing the energizing circuit through solenoid 137. As a result, clutch 60—65 will be disengaged by the action of spring 77 to discontinue longitudinal movement of the carriage, and substantially simultaneously clutch 101—105 will be engaged by the action of solenoid 137 and lever 130 to effect cross feeding movement of the compound rest through cross feed screw 44.

This cross feeding movement will continue until control finger 185 is carried laterally and outwardly clear of shoulder 156a, whereupon spring 182 will again rock the bell crank unit to a position effecting the return of switch arm 171 to its former position, thus causing disengagement of clutch 101—105 and substantially simultaneous engagement of clutch 60—65. This alternate engagement and disengagement of the clutches will continue until the operation is stopped manually or until the carriage has reached its limit of travel as predetermined by the setting of the usual automatic stop, not shown. When the operation is completed, the workpiece 22 will be found to be an accurate reproduction of the step turning pattern as determined by the guiding edge of template 150, with the longitudinal portions of the workpiece corresponding to the similar longitudinal portions of the template and the relative offsets of these longitudinal portions corresponding to the dimensions of the shoulders 156a to 156c measured transversely of the lathe.

It will accordingly be seen that the invention provides simple and effective means for carrying out step turning operations on a lathe by means of the mechanical drives already provided for ordinary longitudinal and cross feeding purposes. Furthermore, the step turning mechanism as described and shown is readily adapted for use as a permanent attachment for a pre-existing lathe without disabling the other functions, controls or operations of the lathe. Thus when switch 175 is open, the automatic step turning controls are completely cut out, and the lathe may be operated in the normal manner for ordinary engine lathe use, the desired longitudinal and cross feeding movements of the compound rest being effected under manual control through handles 70 and 110.

The installation of the attachment on a pre-existing lathe is simple and requires little time. Thus it is conventional to provide manual clutch controls such as handles 70 and 110, which may be mounted directly on the apron by securing the sleeves 72 and 113 to the boss portions 197 (Figs. 4–6) of the apron. In order, therefore, to install the attachment, it is necessary only to transfer collars 72 and 113 to the boss portions 73 of casing 75, substitute shafts 62 and 102 of suitable length, and mount casing 75 directly on bosses 197 on the apron. The feeler unit can be similarly secured to the cross slide by a simple bolting operation, and the lathe will then be ready for automatic step turning operations.

Figs. 12 to 18 illustrate a lathe wherein the clutches for effecting longitudinal and cross feeding movement of the compound rest are operated for step turning by fluid pressure cylinders controlled by an electric control circuit and feeler unit. In Fig. 12, a step turned workpiece 200 is shown as supported by the head stock 201 and tailstock 202 of a lathe provided with a bed 203 supporting a carriage 205 having an apron 206. Carriage 205 in turn supports a compound rest identified generally as 210 of similar construction to the compound rest of the lathe of Figs. 1 to 11 and similarly carrying a tool post and tool 212. The mechanical and manual driving parts in Figs. 12 to 14 are also similar in construction and operation to the corresponding parts in Figs. 1 to 11.

A hydraulic operating unit for the clutch controlling longitudinal movement of carriage 205 is located in the cylindrical casing 215, which is mounted by means of bolts 216 on the boss 217 at the front of apron 206 and thus may be quickly and easily attached to the apron in place of the usual manual control handle and mounting collar described in connection with the lathe of Figs. 1 to 11. Referring particularly to Fig. 14, the clutch for longitudinal movement comprises a gear 220 rotatably mounted by a bushing 221 on a shaft 222 corresponding to shaft 62 and similarly mounted for limited axial movement in apron 206 and the back plate 223 of the apron. Clutch member 225 corresponds to the clutch member 65 and is provided with a beveled friction face 226 for engagement with the corresponding frusto-conical recess in gear 220, and clutch member 225 is secured to shaft 222 for axial movement with the shaft to provide for clutching engagement and disengagement. Gear 220 also carries a pinion 227 corresponding to the pinion 99 in Figs. 3 to 5, and clutch member 225 is mounted on the hub of a pinion 228 which corresponds to the pinion 66 in Figs. 4 and 5.

A piston 230 is slidable in a cylindrical chamber 232 in the outer end of casing 215. A cap 233 is secured to the outer end of casing 215 as by means of bolts 234, and a spring 235 is positioned between cap 233 and piston 230 to bias the piston from right to left as viewed in Fig. 14. A shaft or rod 240 is secured at one end to the piston 230, and it extends through a gland 241 in casing 215 into the chamber 242 in the inner end of the casing. A socket member 243 is threaded on the inner end of rod 240, and its opposite end is tapped for threaded connection with a collar 244 having sliding clearance with shaft 222. The collar 244 is adapted to abut a thrust bearing 245 mounted on the shaft 222 by means of collars 246 and 247 and nuts 248. With this construction when piston 240 moves from right to left in Fig. 14 under the biasing force of spring 235, the annular shoulder 249 in socket member 243 engages the collar 247 and thus moves the shaft 222 similarly from right to left to disengage the clutch 220—225, and when piston 230 moves in the opposite direction, collar 244 will act through bearing 245 and collar 247 to move the shaft 222 from left to right as viewed in Fig. 14 and thus effect engagement of clutch 220—225.

Means are provided for supplying a controlled flow of hydraulic fluid to cylinder 232 between piston 230 and gland 241 to drive the piston against spring 235 and thus to effect engagement of clutch 220—225. Referring particularly to Figs. 13, 14 and 18, a pipe or hose 250 for hydraulic fluid leads into the cylinder 232 as indicated at 251 in Figs. 14 and 18. Hydraulic fluid is supplied to hose 250 under pressure from a suitable source such as a main supply line 252 and pump as indicated in Fig. 18. The main supply line 252 is branched to form separate lines 253 and 254, and the branch line 253 leads to a three-way valve 255 controlled by a solenoid 256 and having a connection to a return line 257 leading to the sump of the supply pump.

The operation of valve 255 is such, as indicated in Fig. 18, that when solenoid 256 is energized, hydraulic fluid under pressure flows from main line 252 and branch line 253 to hose 250 and into cylinder 232, thus forcing piston 230 to its position effecting engagement of clutch 220—225. When solenoid 256 is deenergized, the branch supply line 253 is cut off at valve 255, and the hose 250 is connected directly with the return line 257 to conduct the hydraulic fluid away from cylinder 232 and thus to permit spring 235 to return piston 230 to a position effecting disengagement of clutch 220—225.

A similar operating mechanism is provided for controlling the cross feeding movement of the compound rest 210. The cross feed screw, which is journaled in the cross feed bushing 260 and provided with a ball crank 262 as described and shown in Figs. 3 and 5, is operated through a clutch and gearing of construction similar to those described in connection with Figs. 3 to 6. A hydraulic operating unit of the same construction as that shown in Fig. 14 is located in the cylindrical casing 265 mounted on the front of apron 206, and it includes a cylinder 266, piston 267, spring 268 and piston rod 269 as indicated in Fig. 18. A pipe or hose 270 for hydraulic fluid is connected with cylinder 266 at 271 and is supplied with fluid under pressure from the branch supply line 254 through valve 272, which is similar in construction to valve 255 and is similarly operated by a solenoid 273. It will also be noted that provision is made for conducting back to the sump any hydraulic fluid which may leak past pistons 230 and 267. As shown in Fig. 18, lines 275 and 276 are connected with the low pressure sides of pistons 230 and 267 and connect through a fitting 277 with a line 278 leading to the sump.

Fig. 18 shows the electric circuits for controlling solenoids 256 and 273 to provide for automatic step turning operation of the lathe, and these circuits also are used for effecting manually controlled lathe operation. A main switch unit 300 is mounted on apron 206 as shown in Figs. 12 and 13, and it includes three manually operable switch arms 301, 302 and 303, each having "on" and "off" positions and each controlling a relay 305, 306 and 307 respectively. The switch arm 301 is the selector switch for selecting between manual and automatic operation of the lathe, and one side 310 of the main power line is connected to switch arm 301 through switch arms 302 and 303 and the "off" terminals of the switch arms 302 and 303. The other side 311 of the power line is connected to one of the upper pair of switch terminals of each of the relays 305, 306 and 307, and it is also connected through the operating coil of each of these relays to the "on" terminals of switch arms 301, 302 and 303.

The switch 315 in Fig. 18 corresponds to switch 170 in Fig. 11 and is a single pole, double throw switch in the feeler unit indicated generally at 316 in Fig. 12 which is secured to the compound rest by a bar 317 and provided with a control finger 320. The switch arm 321 of switch 315 is connected to one of the lower pair of switch terminals in relay 305. The terminal 322 of switch 315 is connected to one of the lower pair of terminals in relay 306 and to the solenoid 256, and the other terminal 323 of switch 315 is similarly connected to one of the lower pair of terminals of relay 307 and to the solenoid 273. The two solenoids 256 and 273 are also connected through a line 325 to the upper pair of terminals in each of relays 305, 306 and 307. The switch arm 321 is mounted for shifting movement between its terminals 322 and 323, and this movement is controlled by the control finger 320 in the same manner as already described in connection with Figs. 1 to 11.

It will accordingly be seen that when switch arm 301 is in its "off" position, either of the relays 306 and 307 can be selectively energized by manual shifting of switch arms 302 and 303 to effect selective longitudinal or cross feeding movement, respectively, of the compound rest 210 for normal, non-automatic lathe operations. Thus when switch arm 302 is in "on" position, it completes an energizing circuit through the operating coil of relay 306, and this in turn completes an energizing circuit through solenoid 256, the circuit being from power line 310 through the lower pair of terminals of relay 306 to solenoid 256 and then through line 325 and the upper pair of terminals of relay 306 and back to power line 311. It will also be noted that only one of switch arms 301, 302 and 303 can be operated at any one time. Thus if, for example, switch arm 302 is in "on" position, the circuit through switch arm 301 is open, and if switch arm 303 were then moved to "on" position, this would automatically open the circuit through switch arm 302 to prevent simultaneous longitudinal and cross feeding movement.

As already pointed out, when solenoid 256 is energized, it shifts valve 255 to a position admitting hydraulic fluid to the cylinder 232 to force piston 230 to a position effecting engagement of clutch 220—225. Similarly when switch arm 303 is in "on" position, it completes an energizing circuit through the operating coil of relay 307 and in turn completes an energizing circuit through solenoid 273, the circuit being from power line 310 through the lower pair of terminals of relay 307 to solenoid 273 and then through line 325 and the upper pair of terminals of relay 307 back to power line 311, thus effecting engagement of the proper clutch for cross feeding movement of the compound rest.

For automatic step turning operation of the lathe, switch arm 301 is moved to "on" position, thus energizing the operating coil of relay 305 to close the two pairs of switch terminals therein, and this transfers control of solenoids 256 and 273 to the switch 315 in the feeler unit. Under these conditions, and with switch arm 321 in contact with terminal 322 as shown in Fig. 18, an energizing circuit is completed through solenoid 256, this circuit being from power line 310 through the lower pair of terminals of relay 305 to switch arm 321 and then through terminal 322, solenoid 256, line 325 and the upper pair of terminals of relay 305 to power line 311. Similarly when switch arm 321 is moved into contact with terminal 323, an energizing circuit is completed through solenoid 273, this circuit being from power line 310 through the lower pair of terminals of relay 305 to switch arm 321, and then through terminal 323, solenoid 273, line 325 and the upper pair of terminals of relay 305 to power line 311. It will thus be seen that the lathe can be caused to carry out step turning operations automatically in accordance with an appropriate template or other pattern for effecting selective shifting of the switch arm 321 in a manner similar to that described in connection with Figs. 1 to 11.

Fig. 12 shows the lathe as provided with a series of adjustable stop units 330a to 330e for guiding the feeler unit instead of a template of the construction shown and described in connection with Figs. 1 to 11, and the construction of these stops is shown in more detail in Figs. 15 and 16. Each stop is mounted for longitudinal movement on a guide bar 331 mounted in fixed relation with the lathe bed by means of a suitable bracket 332, which may be of the same construction as the bracket 151 in the lathe of Figs. 1 to 11.

Each stop includes a channel member 333 having its lower portion formed with a dovetail slot as shown in Fig. 15 to receive the upper part of the guide bar 331 and provided with a set screw 334 for securing it in fixed adjusted position on the guide bar. A narrow plate 335 is mounted for sliding movement in each channel 333 transversely of bar 331, the plate 335 being of greater width than the depth of the channel portion in which it is received so that it extends above the top of the channel as shown in Figs. 15 and 16 to serve as a stop member for the control finger 320. A screw 336 is threaded into the outer end of each channel 333 to provide for accurately locating the plate 335, and set screws 337 are provided for locking each plate 335 in adjusted position.

With this construction, the stops 330a to 330e are first adjusted longitudinally of the guide bar 331 at proper relative spacings corresponding to the length of each of the stepped portions of the workpiece. As shown in Fig. 12, the workpiece 200 has five stepped portions and accordingly only four stops are used, the stop 330e being shown as located at the end of guide bar 331 out of the way. After the proper number of stops is arranged longitudinally of the guide bar, the plates 335 are adjusted transversely of the guide bar in accordance with the desired dimensions of the offsets on the workpiece.

The operation of the lathe utilizing stops of the type shown in Fig. 12 is substantially the same as that already described in connection with Figs. 1 to 11. The lathe is first adjusted so that the tool in the compound rest 210 is in proper position for forming the smallest portion of the workpiece, and in this position the feeler unit will be positioned forwardly of the stop 330d, i. e. between the stops 330d and 330e. The lathe is then set in operation with switch arm 301 in "on" position, and it will operate longitudinally until the control finger 320 strikes the plate 335 in stop 330d. This will cause switch arm 321 of switch 315 to shift from terminal 322 to terminal 323, thus shifting the lathe to cross feeding movement until control finger 320 is moved sufficiently to clear the inner end of the plate 335 in stop 330d. Switch 315 will then be shifted back to its position for longitudinal movement of the compound rest, and the same operation will take place until the control finger 320 strikes the plate 335 in stop 330c. Similar alternate operations will be repeated until the workpiece is finished. During each period when the control finger is being carried between adjacent stops, no positive guiding action is required to maintain accurate longitudinal movement of the carriage and compound rest because the switch 315 normally effects engagement of clutch 220—225 except when the control finger is moved to its shifted position as explained in connection with Figs. 7 to 11.

Fig. 17 shows a modified construction of stop 340 similar to the stops 330a to 330e and adapted for use in producing step turned workpieces in which there are relatively short longitudinal portions. As shown, the stop 340 includes a channel portion 341 wider than the channel portion 333 of stops 330a to 330e and provided with three plates 342 each similar to the plates 335. These plates 342 can be adjusted to different positions in the channel in accordance with desired offsets in the workpiece, and each plate 342 is accurately provided with a locating and adjusting screw 343 corresponding to the screw 336 in Figs. 15 and 16. It will also be apparent that the plates 342 can be of different thicknesses to suit particular requirements of the workpiece to be produced. Stops of this construction and of the construction shown in Figs. 15 and 16 have been found particularly desirable for use in the lathe to produce a single step turned workpiece or when the number of duplicate workpieces to be produced does not warrant construction of a one-piece template of the type of the template 150 described in connection with Figs. 1 to 11. It will be seen that these stops can be quickly and readily adjusted in accordance with the special workpiece to be produced, and they will guide the lathe with the same accuracy as a one-piece template as described.

Figure 20:
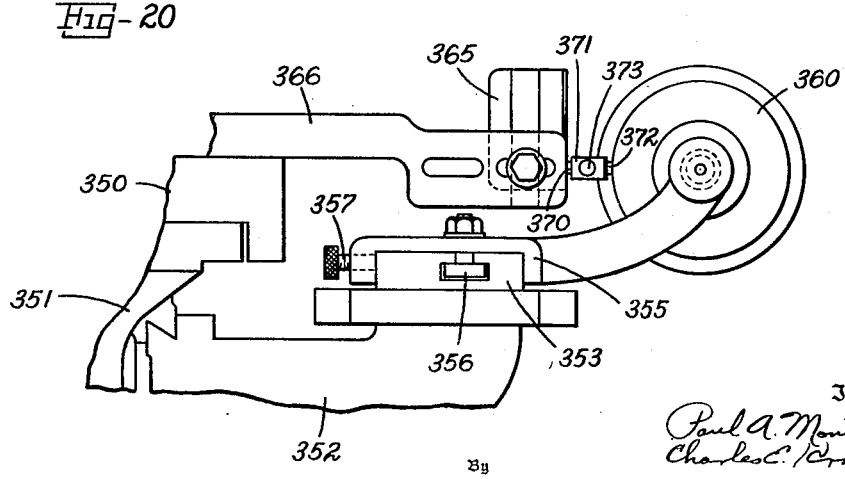
Fig. 20 is a fragmentary view in end elevation of a portion of the lathe shown in Fig. 19.

Figs. 19 and 20 illustrate operation of a lathe provided with step turning mechanism in accordance with the invention guided by a duplicate of the workpiece to be produced. Figs. 19 and 20 show portions of the carriage 350 and bed 351 of a lathe, and a bracket 352 similar to the brackets 151 and 332 is secured to the bed for supporting the lathe-guiding mechanism. A guide bar 353 is secured to the bracket 352, and a bracket 355 is mounted for sliding movement on bar 353 controlled by clamps 356 and set screws 357. The bracket 355 includes an outwardly extending arm portion provided with a center 358 for supporting one end of guide member or pattern 360 shown as a duplicate or replica of the step turned workpiece to be produced on the lathe. The other end of pattern 360 is supported by a bracket 361 similar to the bracket 355 and similarly slidable on bar 353 and including a center 362. Bracket 361 is also provided with clamps 363 and set screws 364 for securing it in adjusted position along bar 353.

A feeler unit 365 is mounted on a bracket 366 similar in construction to the bracket 161 and similarly secured to the compound rest of the lathe, not shown. It will be noted, however, that the feeler unit 365 is turned through 90° from the position shown in Fig. 7 so that its control finger 370 extends horizontally. In order to provide for use of this unit with a guide member 360 having relatively deeply offset portions as shown, an extension unit is secured to the control finger 370 which comprises a collar 371 including a radially projecting finger 372 and a thumb screw 373 for securing the collar to the control finger 370.

The operation of the lathe with this arrangement of guiding mechanism is substantially the same as that of the lathe described in connection with Figs. 1 to 18, depending upon whether an all electric or an electric-hydraulic control mechanism is used. This arrangement has the advantage of providing for quick and accurate reproduction or duplication of a step turned workpiece without requiring time for preparation of a template or even time for adjusting and lining up adjustable stops of the type shown in Figs. 15 to 17. Thus if a plurality of identical step turned workpieces are to be produced, the first can be formed by operation of the lathe under manuel control, and this first specimen used as a pattern or master for automatic production of the remainder. It should also be noted that the guide member 360 need not be an exact duplicate of the workpiece to be produced, i. e. of the same radial dimensions, provided it substantially duplicates the workpiece to the extent that the offsets thereof are of the proper dimensions and are in proper longitudinal spacing.

While the forms of apparatus herein described constitute preferred embodiments of the invention, it is to be understood that the invention is not limited to these precise forms of apparatus, and that changes may be made therein without departing from the scope of the invention which is defined in the appended claims.

What is claimed is:

1. An automatic step turning attachment for a lathe having a carriage with a slide thereon and a mechanical drive including two selectively operable clutches supported by said carriage for effecting selective longitudinal and cross feeding movements of the slide under manual control in normal operation and adapted to be controlled by a stationary pattern for step turning operation, means for biasing each of said clutches in one direction, power operated means for effecting selective movement of said clutches against said biasing means, means for mounting said biasing means and said power operated means on said carriage in operative relation with said clutches, selective feeler control means for said power operated means, means for mounting said control means for movement with said slide in sensing relation with said pattern to effect alternate engagement of said clutches and automatic alternate longitudinal and cross feeding movement of said slide in accordance with said pattern, and manually operable means for selectively effecting movement of said clutches against said biasing means independently of said control means.

2. An automatic step turning attachment for a lathe having a carriage with a slide thereon and selectively operable drive means supported by the carriage for effecting selective longitudinal and cross feeding movements of the slide under manual control in normal operation and adapted to be controlled by a stationary pattern for step turning operation, comprising power operated means for effecting selective operation of said drive means, means for mounting said power operated means on said carriage in operative relation with said drive means, means forming a control circuit for said power operated means, a selective feeler control member for said control circuit, means for mounting said control member for movement with said slide in sensing relation with said pattern to effect automatic alternate operation of said drive means in accordance with said pattern, and manually operable means for effecting selective operation of said drive means for non-automatic operation of said lathe.

3. An automatic step turning attachment for a lathe having a carriage with a slide thereon and a mechanical drive including two selectively operable clutches supported by said carriage for effecting selective longitudinal and cross feeding movements of the slide under manual control in normal operation and adapted to be controlled by a stationary pattern for step turning operation, means for biasing each of said clutches in one direction, power operated means for effecting selective movement of said clutches against said biasing means, means for mounting said biasing means and said power operated means on said carriage in operative relation with said clutches, means forming a control circuit for said power operated means, a selective feeler control member for said control circuit, means for mounting said control member for movement with said slide in sensing relation with said pattern to effect automatic alternate engagement of said clutches to cause alternate longitudinal and cross feeding movement of said slide in accordance with pattern, and manually operable means for effecting selective movement of said clutches against said biasing means for non-automatic operation of said lathe.

4. An automatic step turning attachment for a lathe having a carriage with a slide thereon and a mechanical drive including two selectively operable clutches for effecting selective longitudinal and cross feeding movements of the slide under manual control in normal operation and adapted to be controlled by a stationary pattern for step turning operation, comprising power operated means for effecting selective engagement and disengagement of said clutches, means for mounting said power operated means on said lathe in operative relation with said clutches, means forming a control circuit for said power operated means, a switch in said control circuit having one operating position for effecting engagement of one of said clutches and a second operating position for effecting engagement of the other said clutch, a control finger mounted for pivotal movement with respect to said switch to shift said switch between said operating positions, and means for supporting said switch and control finger for movement with said slide in sensing relation with said pattern to effect switch-shifting movement of said control finger in accordance with said step turning pattern.

5. An automatic step turning attachment for a lathe having a carriage with a slide thereon and a mechanical drive including two selectively operable clutches supported by said carriage for effecting selective longitudinal and cross feeding movements of the slide under manual control in normal operation and adapted to be controlled by a stationary pattern for step turning operation, means for biasing each of said clutches in one direction, cam means for effecting movement of each said clutch against the action of said biasing means, a pair of selectively energizable rotary solenoids, means for mounting said solenoids in position to effect selective clutch-moving action of said cam means in response to energizing thereof, feeler control means for effecting selective energizing of said solenoids, and means for mounting said feeler control means for movement with said slide in sensing relation with said pattern to effect alternate energizing of said solenoids and corresponding alternate longitudinal and cross feeding movement of said slide in accordance with said pattern.

6. An automatic step turning attachment for a lathe having a carriage with a slide thereon and a mechanical drive including two selectively operable clutches supported by the carriage for effecting selective longitudinal and cross feeding movements of the slide under manual control in normal operation and adapted to be controlled by a stationary pattern for step turning operation, fluid pressure operated means mounted for movement with said carriage for effecting selective engagement of said clutches, means for controlling the flow of fluid pressure to and from said fluid pressure operated means, a selective feeler control member for said fluid controlling means having two operating positions for effecting selective engagement of said clutches, and means for mounting said control member for movement with said slide in sensing relation with said pattern to cause said control member to shift between said operating positions in accordance with said pattern.

7. An automatic step turning attachment for a lathe having a carriage with a slide thereon and a mechanical drive including two selectively operable clutches supported by the carriage supported by said carriage for effecting selective longitudinal and cross feeding movements of the slide under manual control in normal operation and adapted to be controlled by a stationary pattern for step turning operation, means for biasing each of said clutches in one direction, fluid pressure operated means mounted for movement with said carriage for effecting selective movement of said clutches against said biasing means, a control circuit for regulating the flow of fluid pressure to and from said fluid pressure operated means, selective feeler control means for said circuit, means for mounting said control means for movement with said slide in sensing relation with said pattern to effect automatic alternate operation of said fluid pressure operated means and corresponding alternate longitudinal and cross feeding movement of said slide in accordance with said pattern, and manually operable means for effecting selective engagement of said clutches for non-automatic operation of said lathe.

8. An automatic step turning attachment for a lathe having a carriage with a slide thereon and selectively operable drive means supported by the carriage for effecting selective longitudinal and cross feeding movements of the slide under manual control in normal operation and adapted to be controlled by a stationary pattern for step turning operation, comprising power operated means for effecting selective operation of said drive means, means for mounting said power operated means on said carriage in operative relation with said drive means, a control circuit for said power operated means, a switch in said control circuit having one operating position for effecting operation of said power operated means to cause longitudinal movement of said slide and a second operating position for effecting operation of said power operated means to cause cross feeding movement of said slide, a control finger mounted for pivotal movement with respect to said switch to shift said switch between said operating positions, and means for supporting said switch and control finger for movement with said slide in sensing relation with said pattern to effect switch-shifting movement of said control finger in accordance with said step turning pattern.

9. Apparatus for automatically forming a step turned workpiece of predetermined configuration on a lathe having a carriage with a slide thereon and selectively operable drive means supported by the carriage for effecting selective longitudinal and cross feeding movement of the slide, power operated means for effecting selective operation of said drive means, means for mounting said power operated means on said carriage in operative relation with said drive means, a control circuit for said power operated means, a switch in said circuit having one operating position for effecting longitudinal movement of said slide and a second operating position for effecting cross feeding movement of said slide, a control finger mounted for pivotal movement with respect to said switch to shift said switch between said operating positions, a bracket adapted to be secured to said lathe, a plate leaving an edge thereof formed with a series of relatively offset longitudinally extending portions connected by transverse shoulder portions to define a step turning pattern, means for securing said plate to said bracket with said edge facing said slide, and means for supporting said switch for movement with said slide and with said control finger extending generally perpendicularly across said plate edge and in contact therewith to effect switch-shifting movement of said control finger in accordance with the configuration of said plate edge.

10. Apparatus for automatically forming a step turned workpiece of predetermined configuration on a lathe having a carriage with a slide thereon and selectively operable drive means supported by the carriage for effecting selective longitudinal and cross feeding movement of the slide, power operated means for effecting selective operation of said drive means, means for mounting said power operated means on said carriage in operative relation with said drive means, a control circuit for said power operated means, a switch in said circuit having one operating position for effecting longitudinal movement of said slide and a second operating position for effecting cross feeding movement of said slide, a control finger mounted for pivotal movement with respect to said switch to shift said switch between said operating positions, a supporting bracket adapted to be secured to said lathe, a plurality of stop units mounted for relative adjustment on said bracket longitudinally of said lathe, each said stop unit including a stop member adjustably supported for movement transversely of said lathe with respect to the said stop members in said other stop units to define therewith a step turning pattern, and means for supporting said switch for movement with said slide and with said control finger in position for successive contact with said stop members to effect switch-shifting movement of said finger in accordance with the longitudinal spacings of said stop units and the transverse spacings of said stop members.

PAUL A. MONTANUS.
CHARLES E. KRAUS.

REFERENCES CITED

The following references are of record in the file of this patent:

UNITED STATES PATENTS

| Number | Name | Date |
|---|---|---|
| 1,711,290 | Shaw | Apr. 30, 1929 |
| 1,937,400 | Bickel | Nov. 28, 1933 |
| 2,051,127 | Bickel et al. | Aug. 18, 1936 |
| 2,143,255 | Abe | Jan. 10, 1939 |
| 2,173,009 | Cotal | Sept. 12, 1939 |
| 2,437,603 | Hornfeck | Mar. 9, 1948 |
| 2,557,860 | Bickel et al. | June 19, 1951 |